Figure 3:
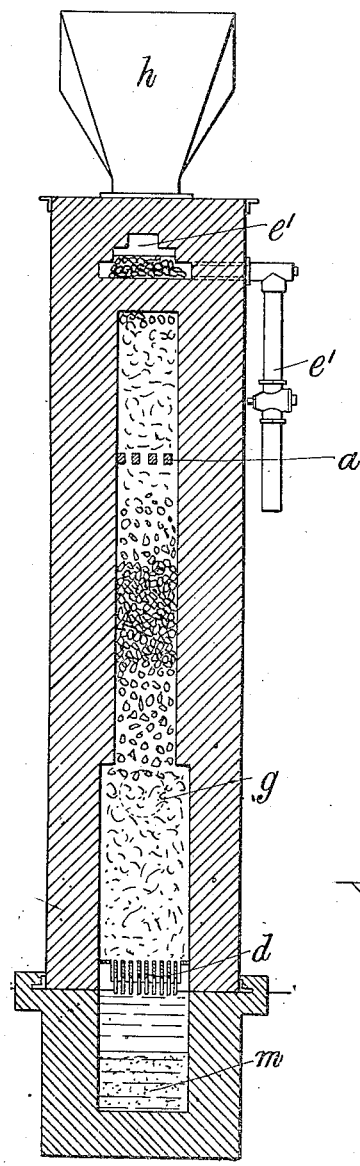

W. J. CROSSLEY & T. RIGBY.
APPARATUS FOR THE MANUFACTURE OF PRODUCER GAS.
APPLICATION FILED AUG. 3, 1907.
943,182.
Patented Dec. 14, 1909.
3 SHEETS—SHEET 1.
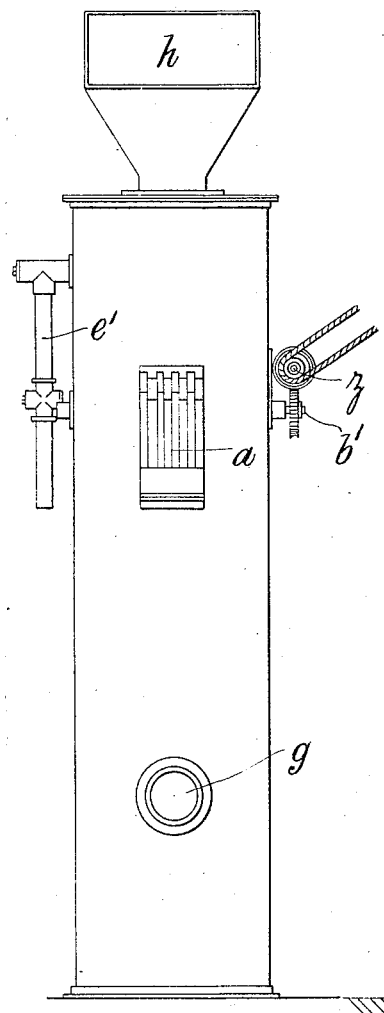
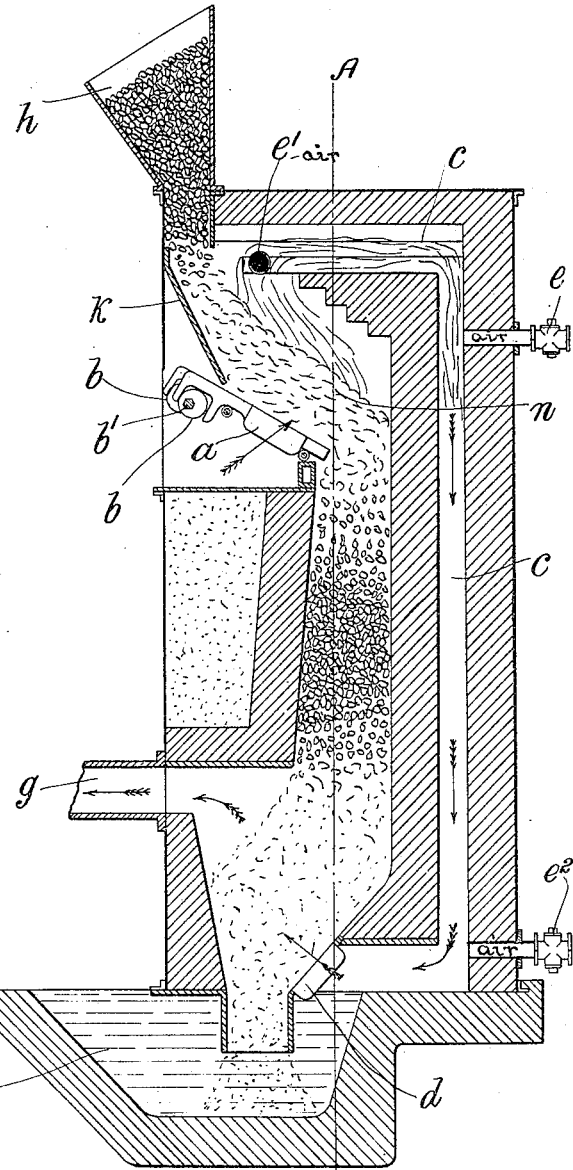

W. J. CROSSLEY & T. RIGBY.
APPARATUS FOR THE MANUFACTURE OF PRODUCER GAS.
APPLICATION FILED AUG. 3, 1907.

943,182.

Patented Dec. 14, 1909.

3 SHEETS—SHEET 2.

WITNESSES
Alvin J. White
W. P. Burk

INVENTORS
William John Crossley
Thomas Rigby
BY Wm. Wallace White
ATTY

W. J. CROSSLEY & T. RIGBY.
APPARATUS FOR THE MANUFACTURE OF PRODUCER GAS.
APPLICATION FILED AUG. 3, 1907.

943,182.

Patented Dec. 14, 1909.

UNITED STATES PATENT OFFICE.

WILLIAM JOHN CROSSLEY AND THOMAS RIGBY, OF MANCHESTER, ENGLAND.

APPARATUS FOR THE MANUFACTURE OF PRODUCER-GAS.

943,182.     Specification of Letters Patent.     Patented Dec. 14, 1909.

Application filed August 3, 1907. Serial No. 386,943.

*To all whom it may concern:*

Be it known that we, WILLIAM JOHN CROSSLEY, of Crossley Brothers Limited, Openshaw, Manchester, in the county of Lancaster, England, and THOMAS RIGBY, of The Square, Fairfield, Manchester, aforesaid, engineers, have invented certain new and useful Improvements in Apparatus for the Manufacture of Producer-Gas, of which the following is a specification.

This invention relates to improvements in apparatus for the manufacture of producer gas free from tar, from fuels containing tarry matter, such as bituminous coal, lignite, peat, wood, etc.

The improved apparatus is mainly intended for the gasification of bituminous coals, most of which cake hard together during the period the volatile matter is being expelled from them. As a consequence when used in an ordinary gas producer, these caking coals are very difficult to work as the caked fuel causes scaffolding and the formation of holes and cavities in the fuel bed.

In our improved apparatus the fuel is spread as hereinafter described in a layer on a suitable primary combustion device and the fuel is in the first place partially burned and subjected to heat in such a manner that the volatile matter is expelled, and the tarry matters contained therein consumed, the resulting heat causing the volatile matter to be expelled from the fresh fuel as it is fed in. (The air supplied for the combustion of the volatile matter given off from the fuel is hereinafter termed the primary air supply). The resultant from this first process consists mainly of carbon and ash, and when the fuel so treated is bituminous coal the product is a coke free from tar. This resultant hereinafter called a coke is in our improved apparatus passed into a gas producer arranged to receive it.

The products of combustion of the volatile matter and primary air will usually be passed either alone, or in conjunction with an additional supply of air through the hot fuel in the gas producer. (This additional supply of air is referred to hereinafter as the secondary air supply). In the result the gas produced is free from tar and most of the heat of the volatile matter is recovered and utilized.

Figure 4:
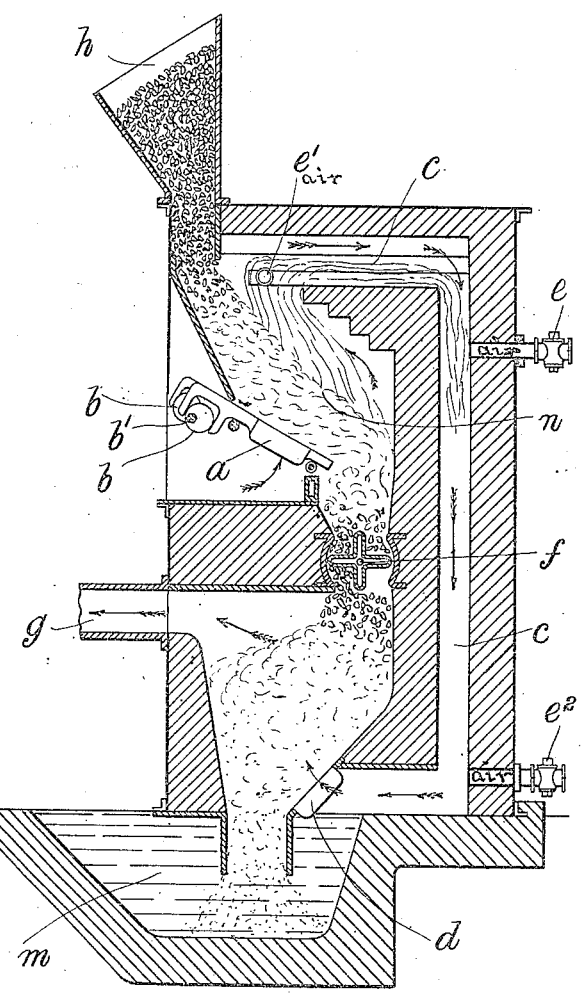
Figure 5:
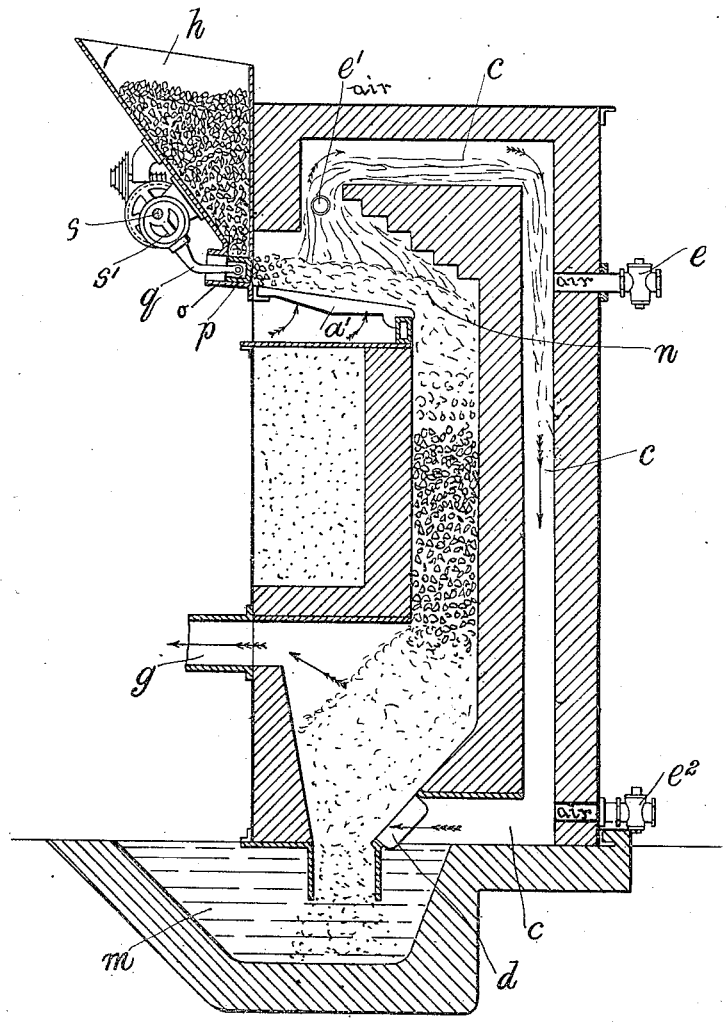

In the accompanying three sheets of drawings—Figure 1 is an elevation, Fig. 2 a sectional elevation and Fig. 3 a sectional elevation on the line A—B, Fig. 2 of a gas producer constructed according to our invention and specially adapted for gasifying caking bituminous coal. Fig. 4 shows the gas producer (Figs. 1, 2, 3) fitted with a valve, through which the coke is passed from the primary combustion device into the gas producer proper. Fig. 5 illustrates our improved gas producer as adapted for use with fuels which cake slightly or not at all.

When using bituminous fuel we prefer that the fuel be burned in the first place in a layer, not necessarily either thin or even, but preferably both thin and even, on or in connection with some breaking, stirring, agitating, or like mechanical device to insure constant ignition of the incoming green fuel. When the coal has a tendency to cake on heating we prefer to use a device like a modified mechanical stoker as used in steam boiler practice, and having movable firebars, which not only provides for constant ignition of the incoming green fuel but insures the breaking up of the coke and clinker (if any) to a size suitable for use in a gas producer. Such an arrangement is illustrated in Figs. 1, 2 and 3, the slightly inclined firebars *a*, being mechanically operated by cams *b* which are arranged alternately at opposite centers on a rotating shaft *b'* so that alternate bars *a* will be moving in opposite directions, the shaft *b'* being driven by worm gearing from a driven shaft *z*. In practice such an arrangement as the foregoing causes the fuel which would otherwise cake together to be constantly agitated so that caking on the moving bars *a* is either prevented or the caked fuel broken up into pieces of suitable size. At the same time any tendency to blow into holes during the primary combustion is corrected by the moving bars.

It will be understood that when the volatile matter has been expelled from the fuel that the coke produced will not cake a second time, the most strongly caking coals when subjected to such mechanical agitation being either broken up after caking or prevented from caking.

The primary air either alone or mixed with steam or other gases or vapors passes through the firebars $a$ as indicated by the arrow Fig. 2, and the layer of fuel thereon and passes as shown by other arrows to the flue $c$ leading to the lower grate $d$. Secondary air may be admitted at any desirable point or points say at $e$, or $e'$, or $e^2$, and mixes with the gaseous products of primary combustion before passing through the grate $d$ and entering the fire. The gas produced leaves through the gas outlet $g$ and is taken away for use. The fuel is stored in the hopper $h$ and descends by gravity over the coking plate $k$, the function of which is to cake the green fuel somewhat by means of the heat of the primary combustion gases before descending to the firebars $a$. The heat developed in and above the layer $n$ should generally be sufficient to cause complete decomposition of the volatile matter but not necessarily so. The ashes produced are taken away as required through the water lute $m$ at the foot of the producer.

As the products of the primary combustion are passed through the gas producer, any hydrocarbon which would otherwise produce tar is completely decomposed or converted by the second combustion.

It will be seen that the depth from the firebars $a$ to the gas outlet $g$ is shown greater than the depth from the lower grate $d$ to the gas outlet, and this is so arranged to prevent short circuiting and insure that all or most of the primary combustion gases will pass by way of the flue $c$ and the grate $d$ to and through the gas producer proper. This short circuiting may be prevented in other ways, as for example, as shown in Fig. 4 which is the same arrangement as that illustrated by Figs. 1, 2 and 3 except that a valve $f$ is shown placed between the primary combustion device and the gas producer proper for the purpose of preventing the gaseous products of combustion from the former passing into the producer by any channel except the flue $c$. The valve $f$ is operated by any suitable means (not shown) from outside the casing, either continuously or intermittingly, and is so arranged as to allow the passage of fuel into the producer while blocking the flow of the gaseous products.

With some fuels we find it advantageous to pass secondary air or steam through the fire separate and apart from the main current of primary combustion gases and if so desired we may arrange for the primary combustion gases and the secondary air or steam to pass through the gas producer either separately or in any combination of gas, air and steam and in any direction to and through the gas producer.

When caking fuel is not being used it is not always advisable to provide a device for breaking up the coke produced by the primary combustion and in some cases we prefer to provide a continuous or intermittent mechanical feeding appliance which may be arranged in any suitable manner to insure that a layer of fuel is continuously subjected to heat and primary combustion and that continuous ignition of the incoming green fuel is obtained. Such a mechanical feeding appliance may be used either alone or in conjunction with an agitating mechanical device as hereinbefore mentioned. Fig. 5 shows an arrangement of such a gas producer in which the fire bars $a'$ are stationary and the fuel from the hopper $h$ is fed forward by the action of a reciprocating pusher $p$ fitted in a guide $o$ and driven by an arm $q$ from an eccentric $s'$ on a rotating shaft $s$ or by any other suitable driving gear. In this arrangement the fuel is fed on or into the primary combustion grate or support in such a manner that the layer of fuel is kept free from blow holes or inequalities during the primary combustion while insuring the continuous ignition of the green fuel as it enters the primary combustion device.

It will be seen that in both arrangements Figs. 1, 2 and 3 and Fig. 5 the gas producer is arranged in such a manner that the path of least resistance for the primary air and products of combustion is clearly defined, but in some cases it is not convenient to so arrange the gas producer and we then arrange for it to be constructed as illustrated in Fig. 4.

It should be understood that the coke as discharged from the primary combustion device is in this arrangement Fig. 4, delivered to the valve $f$, the function of this valve being to distribute the coke to the gas producer proper. The valve may be opened at intervals to discharge the coke produced or it may be continuously operated in such a manner that coke is constantly being discharged into the gas producer.

The products of the primary combustion pass in the usual manner either alone or with secondary air, steam or other gases in any desirable direction or combination to and through the gas producer but usually by way of the flue $c$ and grate $d$ the gas leaving the gas producer at the gas outlet $g$.

In all cases the primary air supply may be passed either through or in contact with the layer of fuel on the primary combustion device.

With fuels which fuse readily we find it advisable to admit steam with the primary air supply to reduce the temperature of the fire, with a view to preventing the formation of clinker which might otherwise be formed in inconvenient quantities.

The exhaust gases of a gas engine or the products of combustion of a furnace may be used if so desired, either alone or mixed with air or air and steam to effect the same purpose as that for which the primary air supply is intended.

The gas producer may be worked under pressure or suction but we preferably arrange it to work by suction in such a manner that the aspiration at the gas outlet pipe of the producer will draw the primary air through the primary combustion device and in addition, if desirable, secondary air steam or other gases to and through the producer in any direction or combination.

Any moisture contained in the fuel is evaporated in the first place in the primary combustion device and passed with the products of combustion to the gas producer, so that a certain quantity of steam is present in the mixture entering the gas producer from this source and in addition, there is usually present the steam produced by combustion of the volatile matter. With some fuel this steam would be sufficient but with others extra steam is required which can be raised by any desirable means either from auxiliary sources or from the heat of the producer of the gases leaving the producer. In some cases especially when the gas from the producer is to be used for heating purposes we find it advantageous to feed water into the fuel entering the gas producer and this is evaporated on the primary combustion device and the steam produced passes over with the products of combustion to and through the gas producer.

It will be understood that the quantity of the volatile matter a fuel contains determines more or less to what extent the fuel is burned during primary combustion and the quantity of secondary air required to complete combustion also depends on the amount of carbon left in the coke.

With some fuels we arrange the depth of the layer in such a manner that all the atmospheric oxygen entering the producer passes through the primary combustion device in the first place and through the coke in the gas producer in the second place. In the result the fuel is mostly consumed to $CO_2$ and steam in the first place and passes as part of the products of combustion into the coke in the gas producer, there taking up the extra carbon required to convert the $CO_2$ to $CO$ and providing the necessary carbon surface for the decomposition of the steam.

We have found it desirable with fuels containing small proportions of fixed carbon that care be taken that the primary combustion be not carried too far or else there will not be sufficient carbon left in the coke to insure the production of a proper quality of producer gas and we prefer generally that the depth of the layer on the primary combustion device shall be such that a maximum proportion of $CO_2$ with little or no excess of oxygen is obtained in the region of primary combustion. It is obviously desirable to lose as little of the sensible heat of the primary combustion gases as possible and in small producers owing to the greater proportionate radiation we have found it advisable to limit the quantity of primary air to such an extent that some combustible gases are carried over in the primary combustion gases.

What we claim and desire to secure by Letters Patent of the United States is:—

1. A gas producer comprising a primary combustion device, a gas producer proper, means for continuously delivering the resulting coke from said device to the producer, and means for passing the products of combustion from the primary combustion device through the coke which is to be consumed in the gas producer proper.

2. A gas producer comprising a primary combustion device, a gas producer proper, means for continuously delivering the resulting coke from said device to the producer, means for passing the products of combustion from the primary combustion device through the coke which is to be consumed in the gas producer proper, and means for preventing the products of combustion from passing to the gas producer with the coke.

3. A gas producer comprising a primary combustion device, means for agitating the fuel in said device, a gas producer proper, said producer having a conduit for receiving the coke from the primary combustion device and delivering it to the producer proper, and means for passing the products of combustion from the primary combustion device through the coke which is to be consumed in the gas producer proper.

4. A gas producer comprising a casing having conduits therein, a primary combustion device at the upper end of the casing, a gas producer proper at the lower end of said casing, one of the conduits delivering the coke from the primary combustion device to the gas producer proper and the other conduit delivering the products of combustion from the primary combustion device through the coke in the gas producer proper, and an agitator in the first named conduit.

5. A gas producer comprising a casing having conduits therein, a primary combustion device at the upper end of the casing, a gas producer proper at the lower end of said casing, one of the conduits delivering the coke from the primary combustion device to the gas producer proper and the other conduit delivering the products of combustion from the primary combustion device through the coke in the gas producer proper, and an agitator and valve in the first named conduit.

In testimony whereof we have signed our names to this specification in the presence of two subscribing witnesses.

WILLIAM JOHN CROSSLEY.
THOMAS RIGBY.

Witnesses:
PERCY E. MATTOCKS,
WM. O. BROWN.